(12) United States Patent
Bougaev et al.

(10) Patent No.: US 8,069,727 B2
(45) Date of Patent: Dec. 6, 2011

(54) INVARIANT MULTI-DIMENSIONAL VIBRATION-RESILIENCE-SIGNATURE GENERATION SYSTEM

(75) Inventors: Anton A. Bougaev, La Jolla, CA (US); Aleksey M. Urmanov, San Diego, CA (US); Daivd K. McElfresh, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 360 days.

(21) Appl. No.: 12/467,432

(22) Filed: May 18, 2009

(65) Prior Publication Data

US 2010/0290144 A1  Nov. 18, 2010

(51) Int. Cl.
*B06B 3/00* (2006.01)
(52) U.S. Cl. ............ 73/663; 360/31
(58) Field of Classification Search ............ None
See application file for complete search history.

(56) References Cited

U.S. PATENT DOCUMENTS

| | | | |
|---|---|---|---|
| 7,089,355 B2* | 8/2006 | Auerbach et al. | 711/112 |
| 7,697,234 B2* | 4/2010 | Higashino et al. | 360/77.03 |
| 2005/0132133 A1* | 6/2005 | Keohane et al. | 711/112 |
| 2007/0035879 A1* | 2/2007 | Hall et al. | 360/137 |
| 2007/0035880 A1* | 2/2007 | Hall et al. | 360/137 |
| 2010/0061007 A1* | 3/2010 | Matsushita et al. | 360/68 |

* cited by examiner

*Primary Examiner* — Andre Allen
(74) *Attorney, Agent, or Firm* — Park, Vaughan, Fleming & Dowler LLP

(57) ABSTRACT

One embodiment of the present invention provides a system that generates vibration-resistance signatures for hard disk drives (HDDs). In this system, a set of HDDs is mechanically affixed to a disk enclosure. The system additionally includes a vibration generator which is mechanically coupled to the disk enclosure and can apply a translational vibration profile to the disk enclosure. The system further includes a coupling mechanism between the set of HDDs and the disk enclosure which translates the translational vibration profile into both translational and rotational vibrations for the set of HDDs in multiple dimensions. The system additionally includes a monitoring mechanism which monitors an HDD performance metric from the set of HDDs while the HDDs are subject to the translational and rotational vibrations. The system also includes a signature-generation mechanism which uses the monitored HDD performance metric to generate vibration-resistance signatures for the set of HDDs.

20 Claims, 3 Drawing Sheets

COMPARATIVE GRAPH 200

INVARIANT MULTI-DIMENSIONAL VIBRATION-RESILIENCE-SIGNATURE GENERATION SYSTEM

BACKGROUND

1. Field

The present invention generally relates to techniques for designing chassis and disk carriers for accommodating hard disk drives (HDDs) in computer systems. More specifically, the present invention relates to a method and an apparatus for rapidly designing and assessing chassis and HDD carriers based on vibration-resilience characteristics of HDDs.

2. Related Art

Computer systems such as servers and storage arrays can be adversely affected by mechanical vibrations of internal components and structures. These vibration problems are becoming more significant because of the following trends: (1) cooling fans are becoming increasingly more powerful; (2) chassis and support structures are becoming weaker because of design modifications to reduce cost and weight; and (3) internal disk drives, interconnects, and other system components are becoming increasingly more susceptible to vibration-induced failures. For example, hard disk drives (HDDs) are becoming more susceptible to vibrations because the storage density for HDDs has increased to the point where a write head has to align with a track which is less than 20 nanometers wide. Moreover, the write head floats only 7 nanometers above the disk surface. These extremely small dimensions make the read and write performance of the HDDs very sensitive to vibrations.

Characterizing the response of components in a computer system, such as HDDs, to vibrations generated by the computer system can be important in both designing computer systems and diagnosing problems in computer systems. Some HDD vendors have chosen to mitigate vibrations in HDDs through vibration damping or by providing passive/active compensation for vibration-induced errors inside HDDs. Unfortunately, these compensation mechanisms only work effectively in certain vibration frequency ranges defined by the cost of the compensation logic and quality of embedded accelerometers. This makes it extremely difficult to select the most suitable HDDs based solely on the vibration specifications provided by the vendors. Moreover, although such vibration specifications may guarantee no hard errors on a disk drive, vibrations may cause the read and write throughput performance of the disk drive to be significantly degraded.

SUMMARY

One embodiment of the present invention provides a system that generates vibration resistance signatures for hard disk drives (HDDs). In this system, a set of HDDs is mechanically affixed to a disk enclosure. The system additionally includes a vibration generator which is mechanically coupled to the disk enclosure and can apply a translational vibration profile to the disk enclosure. The system further includes a coupling mechanism between the set of HDDs and the disk enclosure which translates the translational vibration profile into both translational and rotational vibrations for the set of HDDs in multiple dimensions. The system additionally includes a monitoring mechanism which monitors an HDD performance metric from the set of HDDs while the HDDs are subject to the translational and rotational vibrations. The system also includes a signature-generation mechanism which uses the monitored HDD performance metric to generate vibration-resistance signatures for the set of HDDs.

In some embodiments, the coupling mechanism between an HDD and the disk enclosure includes an HDD carrier, which interfaces with the disk enclosure and encloses the HDD.

In some embodiments, the vibration generator is a translational shake table.

In some embodiments, the vibration generator is configured to generate translational vibrations into three orthogonal directions.

In some embodiments, the vibration generator is configured to apply translational vibrations to the disk enclosure in two or more orthogonal directions.

In some embodiments, the coupling mechanism between an HDD and the disk enclosure further includes one or more connectors which couple power and signal wires to the HDD.

In some embodiments, the translational vibration profile has a flat vibration spectrum between vibration frequencies $f_1$ and $f_2$.

In some embodiments, the translational vibration profile has a non-flat vibration spectrum of non-zero amplitudes between frequencies $f_1$ and $f_2$.

In some embodiments, the vibration generator is configured to apply a set of translational vibration profiles which have stepwise-increasing vibration amplitudes from a minimum root-mean-square (RMS) value to a maximum RMS value. In these embodiments, the signature-generation mechanism generates the vibration-resistance signatures for the set of HDDs, wherein each signature comprises an HDD performance metric as a function of the stepwise-increasing vibration amplitudes.

In some embodiments, the HDD performance metric can include one or more of an HDD read throughput and an HDD write throughput.

DETAILED DESCRIPTION

Figure 1:
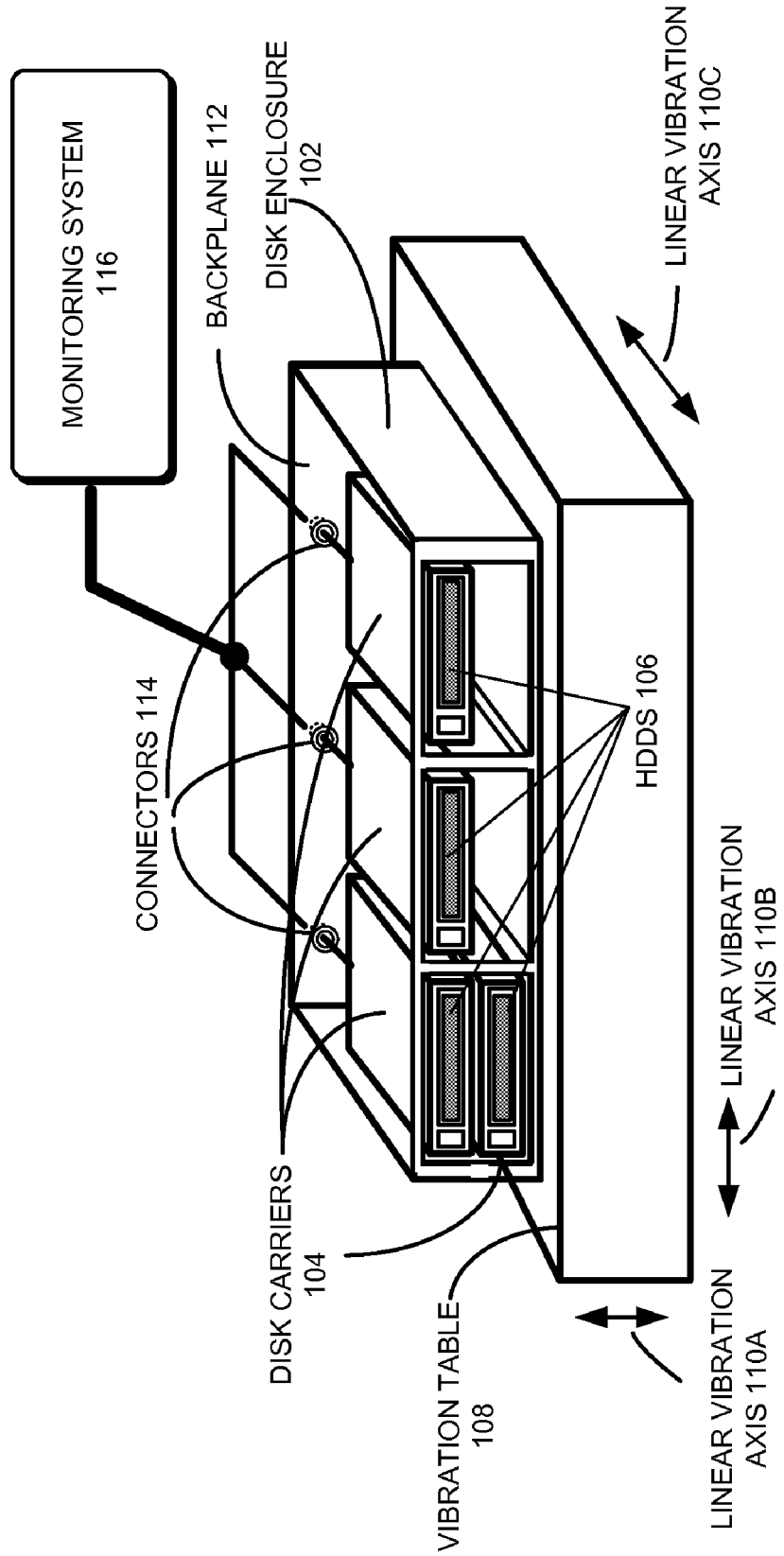
FIG. 1 illustrates a system for generating vibration-resilience signatures for candidate hard disk drives (HDDs) in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Some embodiments of the present invention provide a telemetry-based technique for comparatively evaluating vibration resilience of HDDs in the absence of an actual system chassis. More specifically, the technique uses a prototypical HDD cage as a proxy for an actual system chassis to apply both translational and rotational vibrations to HDDs mounted inside the disk cage. Next, vibration-resilience signatures of HDDs are generated. Then, after comparative evaluations are performed for a set of candidate HDDs based on the vibration-resilience signatures, the HDDs with the best vibration resilience are selected. These selected HDDs may be further tested in real system prototypes (after such real system prototypes become available) and confirmed as the final choice if the real system testing is successful. On the other hand, if the best HDDs according to the comparative evaluation experience significant degradation inside the system chassis, modifications to the chassis design may be required. In the following discussion, the terms "HDD," "disk drive," "disk," and "drive" are used interchangeably.

FIG. 1 illustrates a system 100 for generating vibration-resilience signatures for candidate HDDs in accordance with an embodiment of the present invention.

As illustrated in FIG. 1, system 100 includes a disk enclosure 102 for accommodating one or more HDDs. More specifically, disk enclosure 102 can accommodate multiple disk carriers 104. While four disk carriers are shown inside disk enclosure 102, fewer or more disk carriers can be accommodated inside a given disk enclosure. In some embodiments, disk enclosure 102 is configured to resemble the actual system enclosure where the HDDs are to be mounted. For example, disk enclosure 102 can be an actual or prototype chassis for a computer system in which the HDDs are to be mounted. In one embodiment, disk enclosure 102 is a disk cage which is representative of disk cages used in actual disk array products.

In some embodiments, disk carriers 104 are the same as disk carriers used in the commercial systems, or mechanically similar to the ones used in the commercial systems. Disk carriers 104 are mechanically coupled to disk enclosure 102 in the same manner as they are mounted in the commercial systems to account for the effects of specific drive-mounting techniques. Details of the drive-mounting techniques are discussed below.

Referring to FIG. 1, a set of HDDs 106 to be characterized (i.e., the four shaded boxes inside disk carriers 104) are mechanically coupled to and affixed to disk enclosure 102. More specifically, each of the HDDs 106 is housed inside a corresponding disk carrier 104. Hence, each HDD 106 is indirectly coupled through a corresponding HDD carrier 104 to disk enclosure 102. In some embodiments, the coupling between HDD carriers 104 and disk enclosure 102 can include brackets or other latching mechanisms which facilitate quickly mounting onto and releasing the HDD carriers from disk enclosure 102. In one embodiment, HDDs 106 can be directly attached to disk enclosure 102 without using the HDD carriers.

Note that disk enclosure 102 is mechanically coupled to a vibration table 108. In one embodiment, disk enclosure 102 is secured to vibration table 108 with eccentrics which facilitate quickly mounting and dismounting disk enclosure 102. In one embodiment, vibration table 108 is a translational shake table which is configured to vibrate disk enclosure 102 in one or more desired translational directions. In the embodiment depicted in FIG. 1, vibration table 108 can vibrate disk enclosure 102 along three orthogonally linear axes 110A, 110B, and 110C. For example, vibration table 108 can generate vibrations and excite disk enclosure 102 along one of the three orthogonal axes 110A-110C or simultaneously in two or more orthogonal axes 110A-110C. In some embodiments, a vibration table is used that can vibrate disk enclosure 102 along more than the three orthogonal linear axes 110A-110C. These additional vibration modes can include vibrations along one or more rotational vibration axes (not shown). In some embodiments, vibration table 108 vibrates disk enclosure 102 sinusoidally at each desired vibration frequency. In some embodiments, vibration table 108 vibrates disk enclosure 102 along fewer than three axes.

As shown in FIG. 1, disk enclosure 102 also includes a backplane 112 which facilitates connecting power and signal wires and cables using one or more wire/cable connectors 114, which are tightly affixed to backplane 112. Note that any type of electrical connectors can be used for connectors 114, for example the BNC connectors. In the illustrated configuration of system 100, each HDD 106 is mechanically coupled to disk enclosure 102 through at least two coupling mechanisms: one through disk carriers 104, and the other though wires and cables to connectors 114 in backplane 112. Note that mechanisms that apply rotational forces exist in system 100, which can include, but are not limited to, the latches between disk carriers 104 and disk enclosure 102, connector contacts of connectors 114 in backplane 112, and connecting wires and cables between HDDs 106 and connectors 114. These rotational mechanisms can translate an arbitrary vibration profile applied to disk enclosure 102 into multi-degrees of freedom excitations to HDDs 106. In one embodiment, these rotational mechanisms within disk enclosure 102 translate a translational vibration profile generated by vibration table 108 and applied to disk enclosure 102 into both translational and rotational vibrations (i.e., multi-degrees of freedom excitation), which are applied to HDDs 106. These multi-degrees of freedom excitations can include vibrations in any direction, regardless of the direction of the original vibration. Note that such multi-degrees of freedom excitations are what disk drives experience inside real systems. In some embodiments, system 100 is configured to create a vibration environment which is as close to a real vibration environment as possible.

A monitoring system 116 is coupled to HDDs 106 to monitor one or more disk drive performance metrics of HDDs 106. The monitored disk drive performance metrics can include but are not limited to one or more of the following: a sequential read rate, a sequential write rate, a random read rate, a random write rate, a rate of input/output operations, or any other disk drive operation that can be affected by vibration of HDDs 106 along one or more axes. In some embodiments, monitoring system 116 runs a disk drive performance metric script to monitor the disk drive performance metrics of HDDs 106. For example, monitoring system 116 can issue sequential read and write commands to the drives and can continuously measure and report the I/O rate statistics from these monitored drives. Monitoring system 116 can be implemented in any technology and any combination of hardware and software. In some embodiments, monitoring system 116 operates in a computer system.

In some embodiments, vibration table 108 is programmed to vibrate disk enclosure 102 with a selected vibration profile through a range of amplitudes. For example, one such profile has a flat (i.e., white) vibration spectrum (i.e., frequency band) between a minimum vibration frequency $f_1$ and a maximum vibration frequency $f_2$. Note that both frequencies $f_1$ and $f_2$ can be varied to change the range of the spectrum. For example, a vibration profile with a larger $f_2$ may include more harmonics of fundamental resonances of HDDs 106. In one variation, the vibration profile can have a spectrum from 50 to 2000 Hz. For a given vibration spectrum, the range of amplitudes can be varied stepwise, for example 0, 0.2, 0.4, 0.6, 0.8 and 1 G root-mean-square (RMS). In other embodiments, more or fewer intermediate values and different step-sizes may be selected. Also, the upper limit of the range of amplitudes may be determined in accordance with the vibrational robustness of each of the HDDs 106.

In some embodiments, instead of using flat vibration profiles, non-flat vibration profiles may be generated by vibration table 108 and applied to disk enclosure 102. For example, depending on the application environments, a vibration profile can be designed to emphasize certain regions of a frequency spectrum by using larger amplitudes within these regions than other regions in the same spectrum. In some embodiments, a vibration profile may be first measured from a real system under normal operation. The measured vibration profile is subsequently applied to disk enclosure 102.

Note that system 100 can provide a fixed test environment based on the same disk enclosure, same disk carriers, same backplane and connectors, same vibration table, and the same mechanical coupling between these components. While test HDDs can change, each test drive can be tested under this fixed test environment but with different test vibration profiles. This fixed test environment facilitates quickly performing comparative evaluations of vibration-resilience of multiple candidate HDDs in the absence of the actual system chassis and actual vibration spectra.

Figure 2:
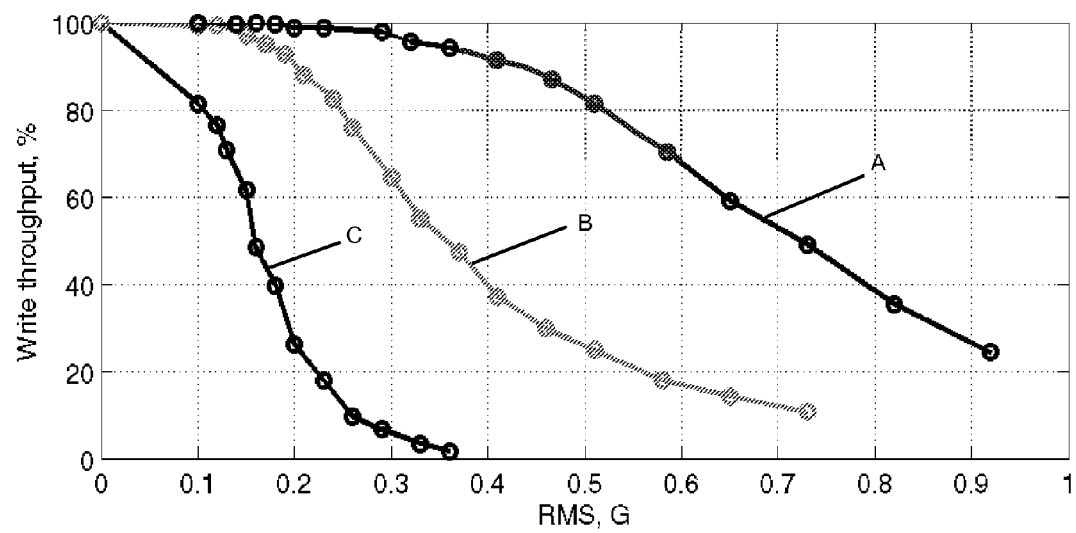
FIG. 2 illustrates a graph which includes a set of write throughput-vs-vibration level curves associated with a set of HDDs in accordance with an embodiment of the present invention.

In one embodiment, monitoring system 116 monitors a disk drive performance metric (e.g., read or write throughput values) for HDDs 106 when disk enclosure 102 is subject to a given vibration profile generated by vibration table 108. More specifically, the disk drive performance metric values for each HDD 106 are measured at each of a set of amplitude levels associated with a common vibration profile. Next, information related to the monitored HDD performance metrics is plotted for all tested HDDs, which provides an illustrative comparison of vibration resilience of different HDDs. For example, FIG. 2 illustrates a comparative graph 200 which includes a set of write throughput-vs-vibration level curves associated with a set of HDDs in accordance with an embodiment of the present invention.

More specifically, graph 200 includes three write throughput-vs-vibration level curves A, B, and C, which correspond to three different drives, which for example can be different models from different manufacturers. Note that these three curves represent the write throughput degradation of each drive as a consequence of a flat, random vibration profile and can be used to perform a quantitative comparison of these drives. As illustrated in FIG. 2, drive A is the most resilient to the applied vibrations, drive C is the least resilient to the vibrations, whereas drive B performs better than drive C but worse than drive A. Note that graph 200 can also be used to determine the maximum allowable vibration levels for different drives. For example, at vibration level of 0.4 G RMS, drive A has only degraded by <10% whereas drive C has completely failed to communicate data. It can be concluded that a much better vibration-isolation mechanism is required when designing a system chassis for drive C than for drive A.

In some embodiments, HDDs which are most resilient to vibrations (i.e., have less degradation for the same level of vibrations) are selected as the disk drives with better vibration performance for a product. On the other hand, disk drives which are more sensitive to the vibrations can be used to design vibration-mitigation features for the chassis. Note that the present invention facilitates comparatively evaluating vibration-resilience information of HDDs. This information can then be used by designers for designing their products.

Figure 3:
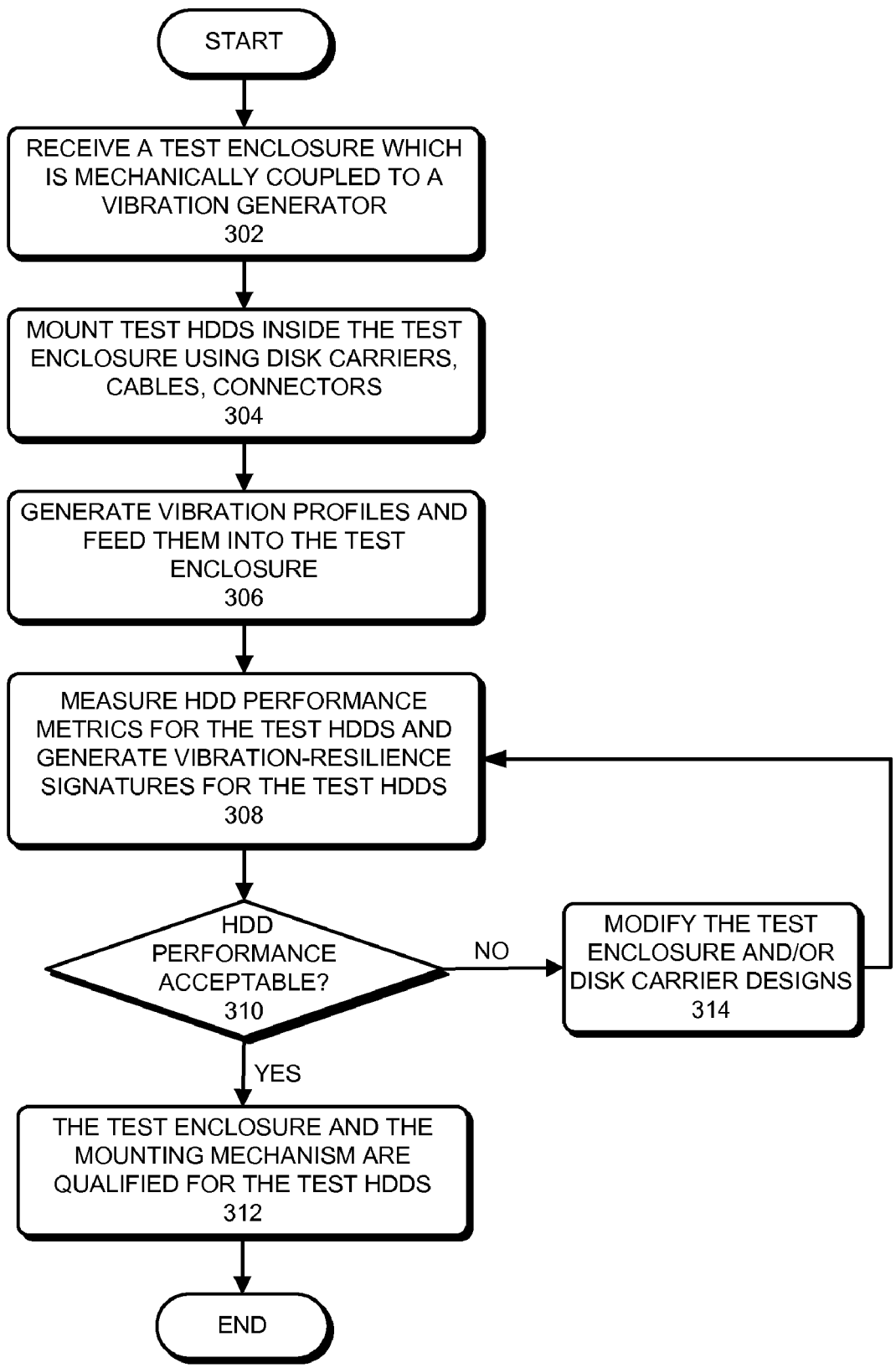
FIG. 3 presents a flowchart illustrating a process of designing chassis and disk carriers based on vibration-resilience signatures of HDDs in accordance with an embodiment of the present invention.

FIG. 3 presents a flowchart illustrating a process of designing chassis and disk carriers based on vibration-resilience signatures of HDDs in accordance with an embodiment of the present invention.

During operation, the system receives a test enclosure which is mechanically coupled to a vibration generator (step 302). In one embodiment, this test enclosure is a mechanically simplified chassis for a prototype computer system or an HDD array. In one embodiment, the vibration generator is configured to generate synthesized vibration profiles based on vibrational characteristics of one or more vibration sources within a computer system chassis. These vibration sources can include, but are not limited to fans, air blowers, and HDDs. Hence, each synthesized vibration profile simulates the vibrational characteristics of one or multiple vibration sources within the real system. Moreover, the vibration generator can also generate random vibration profiles with near constant vibrational spectra.

Next, the system mounts one or more test HDDs inside the test enclosure (step 304). In some embodiment, each test HDD is mechanically coupled to the test enclosure through a disk carrier, mechanically flexible cables, connectors, and other mechanical coupling mechanisms. The disk carrier is rigidly latched onto the test enclosure, and the mechanically flexible cables provide a more flexible connection between the HDD and the test enclosure.

Next, the vibration source generates vibration profiles and feeds them into the test enclosure (step 306). The vibration profiles can include both synthesized vibration waveforms and random vibration profiles at different RMS levels.

While the vibration profiles are being applied on the test enclosure, the system measures one or more HDD performance metrics for the test HDDs and subsequently generates vibration-resilience signatures for the test HDDs as functions of the applied vibration levels (step 308).

The system next determines if the performance of the test HDDs are acceptable based on the associated vibration-resilience signatures (step 310). If so, the test system, which includes the test enclosure, the HDD mounting mechanism, including the disk carriers and cables, is qualified as a candidate system design for the test HDDs (step 312). Otherwise, the system modifies the test enclosure and/or disk carrier designs (step 314) and then repeats steps 308 and 310. Note that the loop process 308→310→314→308 is performed to modify the test enclosure and disk carrier designs until the reliable operation of the test HDDs under the simulated vibration environment is realized.

Note that the above process not only allows acquiring vibration-resilience signatures of the various HDDs before real chassis is physically built, but also facilitates generating qualified chassis and system designs for any given test HDDs.

While the initial test enclosure design may have similarities to the actual chassis design in terms of appearance and/or mechanical structure, the final modified design can be different from existing system designs. Furthermore, the process of "modifying" the chassis/carrier designs based on the vibration-resilience signatures of the given HDDs can be performed in parallel with other system design activities, thereby decreasing design time for the whole system.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system that generates vibration-resistance signatures for hard disk drives (HDDs), comprising:
    a disk enclosure configured to accommodate one or more HDDs;
    a set of HDDs mechanically coupled to and affixed to the disk enclosure;
    a vibration generator mechanically coupled to the disk enclosure and configured to apply a translational vibration profile to the disk enclosure;
    a coupling mechanism between the set of HDDs and the disk enclosure, which translates the translational vibration profile into both translational and rotational vibrations for the set of HDDs in multiple dimensions; and
    a monitoring mechanism configured to monitor an HDD performance metric from the set of HDDs while the HDDs are subject to the translational and rotational vibrations; and
    a signature-generation mechanism configured to use the values of the HDD performance metric to generate vibration-resistance signatures for the set of HDDs.

2. The system of claim 1, wherein the coupling mechanism between an HDD and the disk enclosure includes an HDD carrier, which interfaces with the disk enclosure and encloses the HDD.

3. The system of claim 1, wherein the vibration generator is a translational shake table.

4. The system of claim 1, wherein the vibration generator is configured to generate translational vibrations along three orthogonal directions.

5. The system of claim 1, wherein the vibration generator is configured to apply translational vibrations to the disk enclosure along two or more orthogonal directions.

6. The system of claim 1, wherein the coupling mechanism between an HDD and the disk enclosure further includes one or more connectors which couple power and signal wires to the HDD.

7. The system of claim 1, wherein the translational vibration profile has a flat vibration spectrum between vibration frequencies $f_1$ and $f_2$.

8. The system of claim 1, wherein the translational vibration profile has a non-flat vibration spectrum of non-zero amplitudes between frequencies $f_1$ and $f_2$.

9. The system of claim 1,
    wherein the vibration generator is configured to apply a set of translational vibration profiles which have stepwise-increasing vibration amplitudes from a minimum root-mean-square (RMS) value to a maximum RMS value; and
    wherein the signature-generation mechanism is configured to generate the vibration-resistance signatures for the set of HDDs, wherein each signature comprises an HDD performance metric as a function of the stepwise-increasing vibration amplitudes.

10. The system of claim 1, wherein the HDD performance metric can include one or more of:
    an HDD read throughput; and
    an HDD write throughput.

11. The system of claim 1, wherein the vibration generator is configured to generate vibrations that simulate a vibration profile which is based on measured vibration characteristics of components in the system.

12. A method for generating vibration-resistance signatures for hard disk drives (HDDs), comprising:
    locating a set of HDDs inside a disk enclosure, wherein the set of HDDs are mechanically coupled to and affixed to the disk enclosure through a coupling mechanism;
    applying a translational vibration profile to the disk enclosure, wherein the coupling mechanism between the set of HDDs and the disk enclosure translates the translational vibration profile into both translational and rotational vibrations for the set of HDDs in multiple dimensions;
    monitoring an HDD performance metric from the set of HDDs while the HDDs are subject to the translational and rotational vibrations; and
    generating vibration-resistance signatures for the set of HDDs using the values of the HDD performance metric.

13. The method of claim 12, wherein prior to applying the translational vibration profile, the method further comprises mechanically coupling the disk enclosure to a vibration generator, which is configured to generate a translational vibration profile.

14. The method of claim 13, wherein the vibration generator is a translational shake table.

15. The method of claim 12, wherein applying the translational vibration profile to the disk enclosure involves applying translational vibrations along three orthogonal directions.

16. The method of claim 12, wherein applying the translational vibration profile to the disk enclosure involves applying translational vibrations to the disk enclosure along two or more orthogonal directions.

17. The method of claim 12, wherein the coupling mechanism between an HDD and the disk enclosure can include:
    an HDD carrier, which interfaces with the disk enclosure and encloses the HDD; and
    one or more connectors which couple power and signal wires to the HDD.

18. The method of claim 12, wherein the translational vibration profile has a flat vibration spectrum between vibration frequencies $f_1$ and $f_2$.

19. The method of claim 12, wherein the translational vibration profile has a non-flat vibration spectrum of non-zero amplitudes between frequencies $f_1$ and $f_2$.

20. The method of claim 12, wherein the method further comprises:
    applying a set of translational vibration profiles which have stepwise-increasing vibration amplitudes from a minimum root-mean-square (RMS) value to a maximum RMS value; and
    generating the vibration-resistance signatures for the set of HDDs, wherein each signature comprises an HDD performance metric as a function of the stepwise-increasing vibration amplitudes.

* * * * *